Figure 1:
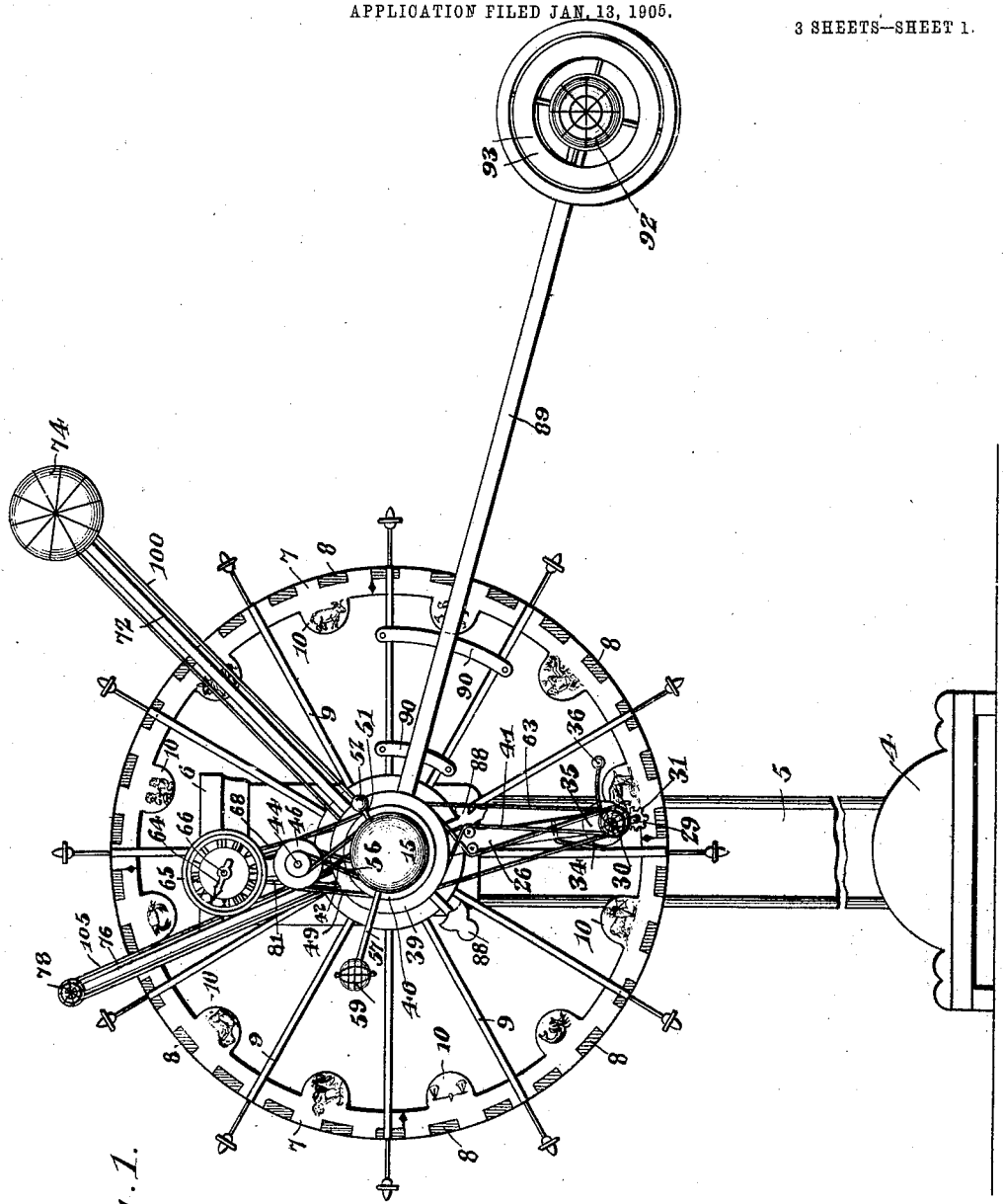

No. 831,231. PATENTED SEPT. 18, 1906.
P. LINDBERG, DEC'D.
A. W. FISK, ADMINISTRATOR.
PLANETARIUM.
APPLICATION FILED JAN. 13, 1905.

3 SHEETS—SHEET 1.

Witnesses
Jas. K. McCathran
B. S. Foster

Peter Lindberg, Inventor
By C. S. Siggers
Attorney

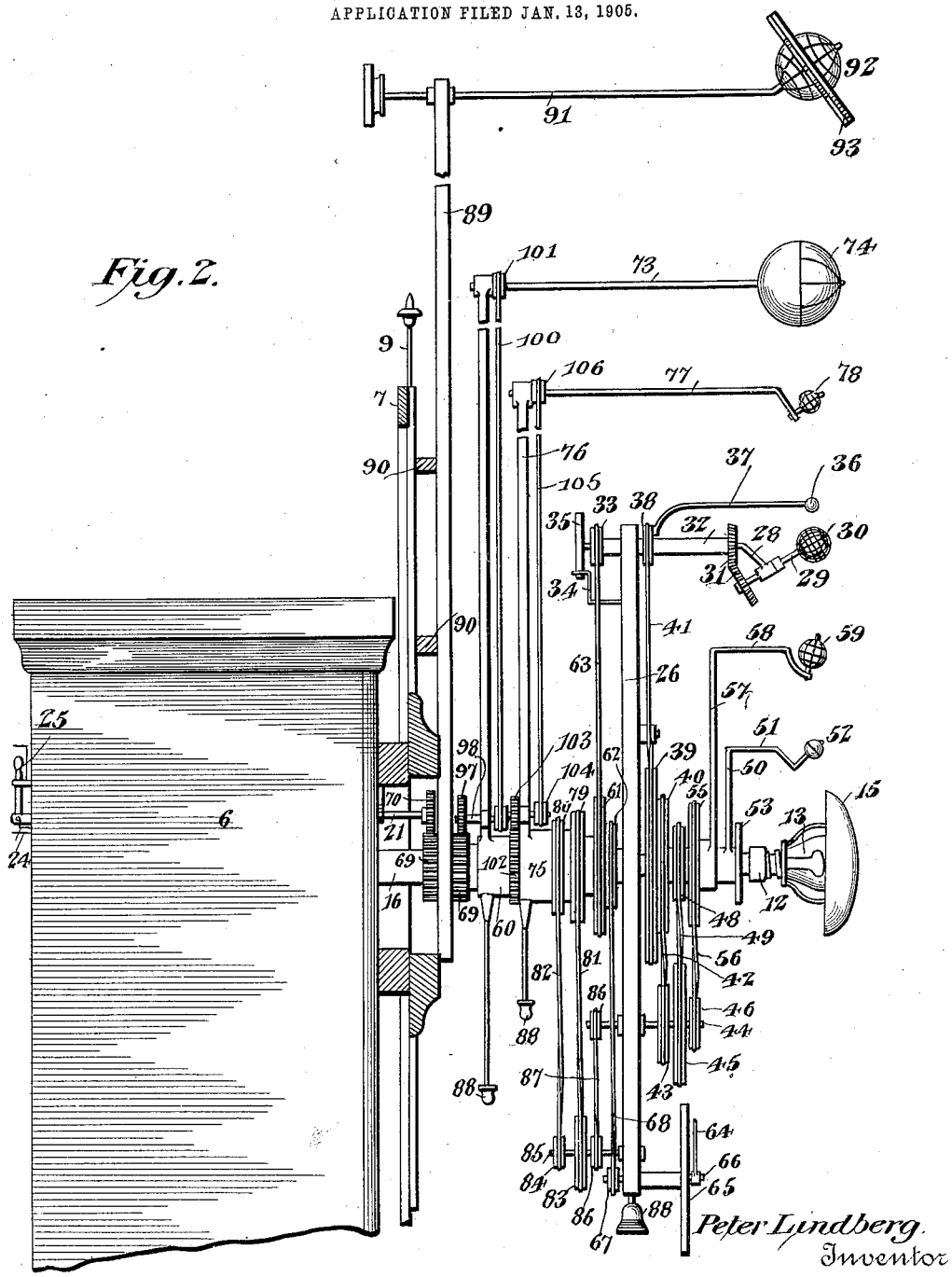

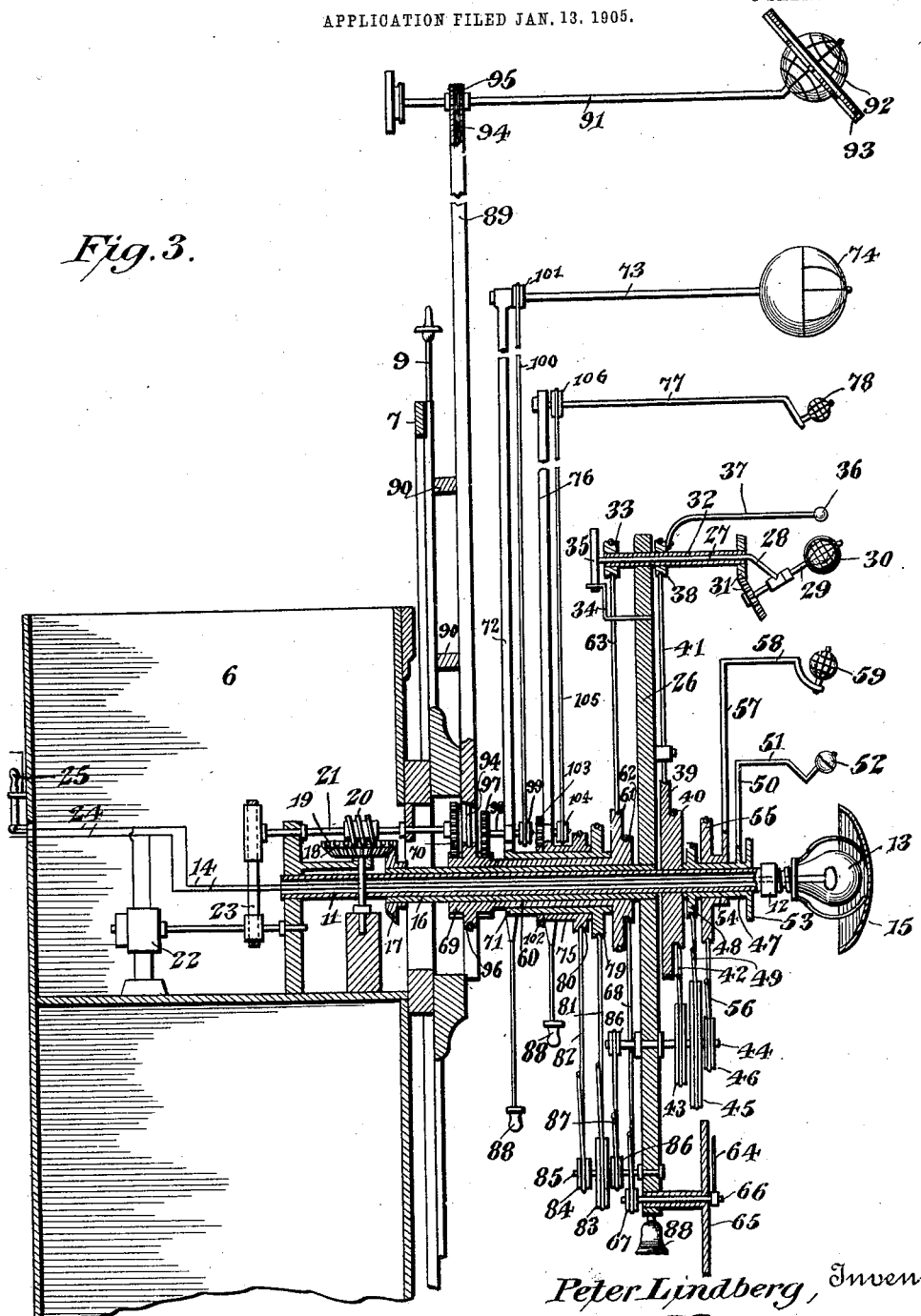

UNITED STATES PATENT OFFICE.

PETER LINDBERG, OF DE KALB, ILLINOIS; A. W. FISK ADMINISTRATOR OF PETER LINDBERG, DECEASED.

PLANETARIUM.

No. 831,231.  Specification of Letters Patent.  Patented Sept. 18, 1906.

Application filed January 13, 1905. Serial No. 240,905.

*To all whom it may concern:*

Be it known that I, PETER LINDBERG, a citizen of the United States, residing at De Kalb, in the county of Dekalb and State of Illinois, have invented a new and useful Planetarium, of which the following is a specification.

This invention relates to improvements in planetariums.

It is a well-known fact that it is a very difficult and sometimes an almost impossible task for a student to comprehend the various movements and relations of the bodies of the solar system and the phenomena resulting therefrom by mere explanation together with drawings.

It is therefore the principal object in the present case to provide novel means of a simple nature whereby the system and its movements may be illustrated in a physical manner with sufficient clearness to enable any one possessed of ordinary intelligence to comprehend the movements and relations existing between the planets.

An embodiment of the invention is illustrated in the accompanying drawings, wherein—

Figure 1 is a view in front elevation of the new apparatus. Fig. 2 is a side elevation of the same, the various planets and planet-supports being shown in line in order to more clearly illustrate the structure. Fig. 3 is a sectional view with the parts disposed as shown in Fig. 2.

Similar reference-numerals designate corresponding parts in all the figures of the drawings.

In the embodiment illustrated a base 4 is employed, carrying a standard 5, the upper end of which is in the form of a casing 6. This standard and base may be of any desirable form and construction, may be of any suitable material, and can be ornamented as desired. The same is true of the various mechanisms going to make up the planetarium. Upon the upper portion of the standard is supported an upright ring 7, the exposed face of which is suitably sectioned by small fields 8, preferably indicating a predetermined number of degrees—as, for instance, six—and separated by spaces of an equal number of degrees. The ring is, furthermore, divided by twelve supporting-spokes 9 into twelve sections, the whole forming, in effect, the zodiac and the ring having projections 10, on which the signs of such zodiac are suitably illustrated.

Projecting from the casing 6 concentric to the ring 7 and extending beyond said ring is a hollow axle 11, the outer end of which is provided with an electric-lamp socket 12, that receives a suitable incandescent lamp 13, the leads 14 to said lamp extending through the axle. The outer end of this lamp is covered by a shade 15, which is substantially concavo-convex and prevents the light being thrown outwardly, but permits its unobstructed lateral passage in all directions. The lamp of course represents the sun, and the rays therefrom thus shine freely in the plane of the ecliptic.

Journaled upon the axle 11 is a driving-shaft 16, having at its inner end a bevel gear-wheel 17, meshing with a substantially horizontal bevel gear-wheel 18, provided with suitable worm-teeth 19. Meshing with the teeth 19 is a worm 20, carried by a shaft 21, that is driven from an electric motor 22 through the medium of suitable reducing-gearing 23, the motor and gearing being disposed within the casing 6. This motor is driven from any suitable source of electric current, to which the lamp is also connected, the leads being shown at 24, and one of the same includes a suitable switch 25, by means of which the motor and lamp can be controlled. The outer end of the driving-shaft 16 has secured thereto an earth-supporting arm 26, extending on opposite sides of said shaft. One end of the earth-supporting arm 26 carries a suitable stem 27, having an offset terminal 28, in which is journaled a shaft 29, carrying the earth globe or planet 30. The shaft 29, and therefore the planet 30, is rotated through the medium of suitable gearing 31 and a hollow shaft 32, journaled upon the stem 27 and carrying a pulley 33 at its rear end. The stem 27, while capable of rotating, is restricted by means of a brake 34, carried by the arm 26 and bearing against a brake-wheel 35 on said stem. A moon-globe 36 revolves about the earth-globe, being carried by a stem 37, that is attached to a pulley 38, journaled on the sleeve 32.

A pair of stationary pulleys 39 and 40 are secured to the axle 11 outside the earth-supporting arm, the pulley 39 being connected to the moon-pulley 38 by means of a belt 41, the other pulley 40 having a belt 42 passing about the same, which belt also passes about a pulley 43 on a counter-shaft 44, that is journaled in the earth-supporting arm 26 on the side of the shaft opposite that carrying the earth. The front end of the counter-shaft 44 projects in advance of the earth-arm and is provided with a pair of pulleys 45 and 46 of different diameters. A sleeve 47 is journaled upon the front portion of the axle between the stationary pulley 40 and the lamp and is provided with a pulley 48, connected with the pulley 45 by means of a belt 49. This sleeve also carries an arm 50, provided with a stem 51, that supports a planet-body 52, representing Mercury, said sleeve being furthermore provided with a balance-wheel 53. Journaled on the sleeve 47 is another sleeve 54, having a pulley 55, connected to the pulley 46 by means of a belt 56. This sleeve 54 carries an arm 57, provided with an offset stem 58, on which is mounted a planet-body 59, representing Venus.

Journaled on the driving-shaft 16 in rear of the earth-supporting arm 26 is a sleeve 60, carrying at its outer end a pair of pulleys 61 and 62 of different diameters, the pulley 61 being connected with the earth-rotating pulley 33 by means of a belt 63. Journaled in the opposite end of the earth-supporting arm 26 to that carrying the earth is a pointer 64, operating over a dial 65, which, as shown in Fig. 1, is provided with an hour-scale marked from "1" to "12." The pointer-shaft 66 carries at its rear end a pulley 67, which is connected to the pulley 62 by means of a belt 68. The sleeve 60 has at its inner end a double gear-wheel 69, driven from a gear-wheel 70, located on the outer end of the shaft 21, said sleeve being thus rotated from said shaft. Journaled upon the sleeve 60 is another sleeve 71, carrying an outstanding supporting-arm 72, in the free end of which is rotatably mounted a stem 73, carrying a planet-body 74, representing Jupiter. In the particular embodiment shown the body 74 is shown as having its axis concentric with that of the stem 73; but it may be set at a slight inclination, if desired. Another sleeve 75, journaled upon the sleeve 71, has an arm 76, in the free end of which is journaled a stem 77, carrying a planet-body 78, representing Mars. The sleeves 71 and 75 are respectively provided with pulleys 79 and 80, around which pass belts 81 and 82, that also pass about pulleys 83 and 84, carried by a stub-shaft 85, journaled on the earth-supporting arm 36. This shaft is driven from the counter-shaft 44 through the medium of pulleys 86 and a belt 87. The arms 26, 72, and 76 are suitably counterweighted, as shown at 88, so that they will be balanced, and thus comparatively light power is needed to drive the same. Another arm 89 is adjustably mounted on the zodiac-ring, being suitably secured by brackets 90 to certain of the spokes 9. As these brackets can be attached to any of the spokes, the arms 89 can thus be arranged at different places about the ring. This arm carries at its outer end a stem 91, journaled in said arm and provided with a planet-body 92, representing Saturn and surrounded by rings 93. The stem 91 is rotated by a belt 94 passing about a pulley 95 on said stem and about a pulley 96, carried by the double gear-wheel 69. With said gear-wheel is also meshed a gear-wheel 97, carried by a shaft 98, which has a pulley 99, that receives a belt 100. This belt operates upon a pulley 101, carried by the stem 73, which supports the Jupiter planet. Secured to the sleeve 71 is a gear-wheel 102, with which meshes a gear-wheel 103, connected to a pulley 104, driving a belt 105, that engages a pulley 106, carried by the Mars-supporting stem 77.

It will of course be understood that the various pulleys and belts are of the proper relative size to drive the various bodies and rotate the same at substantially the relative speed of the planets which they represent, all the mechanism being driven from the motor 22 and supported upon the axle 11. It will be apparent that when the switch 25 is closed the lamp 13 will be lighted and the motor thrown into operation. The various planets will therefore be illuminated from said lamp and will operate in an ecliptic at suitable speeds around the same. This, it is thought, will be clear when it is considered that the earth-supporting arm 26 is driven positively from the motor, and consequently as the pulley 40 is stationary the shaft 44 will be rotated, and thus the Mercury and Venus supporting arms 30 and 37 will also be revolved around the lamp. The rotation of the counter-shaft 44 will also cause the rotation of the shaft 85, and therefore the revolution of the arms 72 and 76, carrying the Mars and Jupiter planets 74 and 78. Moreover, the pulley mechanism will always turn these various planets on independent axes of their own, and motion will be communicated to the moon from the stationary pulley 39. The earth and pointer 64 will be rotated upon their respective axes by the pulleys 61 and 62, positively driven from the shaft 21, the pointer operating at a proper speed to illustrate the time in which the various planets revolve about the sun. As Saturn moves with such slowness about the sun, the same has been made stationary, though adjustable; but its rapid rotation on its own axis is illustrated. While in the particular embodiment shown many of the parts are illustrated somewhat diagrammatically, nevertheless by this means it is thought the movements of the planets can be readily explained, together with the phenomena resulting therefrom, for their various relations can be at least indicated better physically than by drawings.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In a planetarium, the combination with an upright support, of a substantially horizontal hollow axle carried thereby, an electric lamp supported on the free end of the axle, leads for said lamp extending through the axle, a plurality of supports revolubly mounted on the axle, planet-bodies carried by the supports and revoluble in a plane around the lamp, means including a driving-shaft journaled on the axle for revolving the supports at different rates of speed, and an opaque shade extending over the outer end of the lamp and terminating short of the plane in which the bodies revolve, whereby said bodies will be illuminated by the lamp.

2. In a planetarium, the combination with a driving-shaft, of a plurality of planet-supports revoluble on said shaft, means for rotating the driving-shaft, and means for rotating the planet-supports from said driving-shaft.

3. In a planetarium, the combination with a driving-shaft, of a plurality of planet-supports revolubly mounted concentrically on said shaft, means for rotating the driving-shaft, and means for revolving the planet-supports at different rates of speed from said driving-shaft.

4. In a planetarium, the combination with a driving-shaft, of a plurality of planet-supports journaled on said shaft and revoluble about the same, means for rotating the driving-shaft, and gearing connecting the driving-shaft and supports for revolving the latter at different speeds from the former.

5. In a planetarium, the combination with an axle, of a main driving-shaft journaled thereon, a plurality of concentrically-disposed sleeves journaled on the driving-shaft, arms carried by the sleeves, planets carried by the arms, and gearing connecting the driving-shaft and the sleeves journaled thereon for rotating said sleeves at different speeds.

6. In a planetarium, the combination with a rotating planet-support, of a stationary member, a rotatable device mounted on the rotary support, gearing connecting the stationary member and rotatable device, another rotary planet-support, and gearing connecting the rotatable device and the last-mentioned rotary support.

7. In a planetarium, the combination with a rotary planet-support, of a stationary pulley, a rotatable shaft journaled on the rotary support, gearing connecting the pulley and shaft, another rotary planet-support, and gearing connecting the shaft and the last-mentioned rotary support.

8. In a planetarium, the combination with a stationary pulley, of a driving-shaft carrying a rotary support, a counter-shaft journaled on the rotary support, a pulley carried by the shaft, a belt connecting the stationary pulley and shaft-pulley, a plurality of planet-supports revolubly mounted on the driving-shaft, and means for rotating said various supports from the counter-shaft.

9. In a planetarium, the combination with an axle, of a driving-shaft journaled thereon, an arm carried by the driving-shaft, a counter-shaft journaled on the arm, a pulley secured to the axle, a pulley secured to the counter-shaft, a belt connecting the pulleys, a plurality of rotatable sleeves, gearing connecting the sleeves and the counter-shaft, and planet-supporting arms carried by the sleeves.

10. In a planetarium, the combination with an axle, of a driving-shaft journaled thereon, a supporting-arm carried by the shaft, a counter-shaft on the arm, gearing connecting the axle and counter-shaft, a stub-shaft on the arm driven from the counter-shaft, a plurality of concentrically-disposed sleeves journaled on the driving-shaft, gear connections between the stub-shaft and the sleeves, and planet-supporting arms carried by the sleeves.

11. In a planetarium, the combination with a plurality of planet-supports, of means for revolving the same at different speeds, a dial, a pointer movable over the dial, and means operated by the support-driving means for operating the pointer.

12. In a planetarium, the combination with a plurality of planet-supports, of means for revolving the same at different speeds, a dial carried by one of the supports, a pointer movable over the dial, and means operated by the planet-support-driving means for operating the pointer.

13. In a planetarium, the combination with a revoluble planet-supporting arm pivotally mounted between its ends, of a planet journaled on one end of the arm, a dial located at the other end of the arm, a pointer operating over the dial, and means for operating the planet and pointer.

14. In a planetarium, the combination with a shaft, of an arm carried thereby and projecting on opposite sides of the shaft, a sleeve on the shaft, pulleys of different sizes carried by the sleeve, a planet rotatably supported on the arm on one side of the shaft, a dial located on the arm on the other side of the shaft, a rotary pointer operating over the dial and belting connecting the pulleys and driving the planet and pointer.

15. In a planetarium, the combination with a driving-shaft, of a plurality of planet-supporting arms journaled on and supported by the shaft, a plurality of planets journaled on the arms, means operated by the driving-shaft for revolving the arms at different speeds, and means for operating the planets on the arms.

16. In a planetarium, the combination with an axle, of a driving-shaft journaled on the axle, a plurality of sleeves journaled on the shaft, arms carried by the sleeves, planets journaled on the free ends of the arms, means connecting the driving-shaft and sleeves for rotating the sleeves from said shaft, shafts carried by certain of the arms and connected with the planets, and means for rotating said shafts upon the rotation of the sleeves.

17. In a planetarium, the combination with a hollow axle, of a lamp supported on one end of the same, a driving-shaft journaled on the axle, a plurality of sleeves concentrically journaled on the shaft, arms carried by the shaft and the sleeves, stems journaled on the free ends of the arms, planets carried by the stems and located in an ecliptic of the lamp, a motor for driving the shaft, gearing connecting the axle, the arm carried by the driving-shaft, and the sleeves, for rotating the said sleeves, and means for rotating the stems carrying the planets, said means being driven by the motor.

18. In a planetarium, the combination with a driving-shaft, of a plurality of planet-supports revolubly mounted thereon, and means connecting the shaft and supports for rotating the latter from and upon the former.

19. In a planetarium, the combination with a driving-shaft, of a plurality of revoluble planet-supports, said supports and shaft having coincident journal-axes, means for driving the shaft, and gearing connecting the shaft and supports for rotating the latter at different rates of speed.

In testimony that I claim the foregoing as my own I have hereto affixed my signature in the presence of two witnesses.

PETER LINDBERG.

Witnesses:
G. W. BALDWIN,
G. H. MILLER.